(12) United States Patent
Abeta et al.

(10) Patent No.: US 8,002,531 B2
(45) Date of Patent: Aug. 23, 2011

(54) FORMING EQUIPMENT COMPRISING CARRIAGES CARRYING LOWER MOLDS

(75) Inventors: Hiroshi Abeta, Toyokawa (JP); Atsushi Suzuki, Toyokawa (JP)

(73) Assignee: Sintokogio, Ltd., Aichi Ken (JP)

( * ) Notice: Subject to any disclaimer, the term of this patent is extended or adjusted under 35 U.S.C. 154(b) by 145 days.

(21) Appl. No.: 12/323,850

(22) Filed: Nov. 26, 2008

(65) Prior Publication Data

US 2009/0142433 A1   Jun. 4, 2009

(30) Foreign Application Priority Data

Nov. 30, 2007   (JP) .................................. 2007-309680

(51) Int. Cl.
*B29C 43/00* (2006.01)

(52) U.S. Cl. ........ 425/112; 425/150; 425/186; 425/193; 425/359; 425/411

(58) Field of Classification Search .................. 425/112, 425/150, 167, 186, 193, 357, 358, 359, 411, 425/451.6
See application file for complete search history.

(56) References Cited

U.S. PATENT DOCUMENTS 3,731,514 A * 5/1973 Deibele, Jr. ...................... 72/306
5,176,923 A * 1/1993 Ito .................................. 425/150
6,294,114 B1   9/2001 Muirhead
6,749,418 B2   6/2004 Muirhead

FOREIGN PATENT DOCUMENTS

| JP | 2001-191316 A | 7/2001 |
| JP | 2004 345328 A | 12/2004 |
| JP | 2005-125376 A | 5/2005 |

* cited by examiner

*Primary Examiner* — Richard Crispino
*Assistant Examiner* — Thu Khanh T Nguyen
(74) *Attorney, Agent, or Firm* — Finnegan, Henderson, Farabow, Garrettt and Dunner, L.L.P.

(57) ABSTRACT

Forming equipment having carriages carrying lower molds that can improve the quality of a molded product by fixing a carriage carrying the lower mold at the forming station when forming is carried out. The equipment includes a forming press that molds thermoplastic sheet material H with a upper mold MU and lower molds MR, ML, wherein the equipment has two carriages TR, TL, each carrying a lower mold, which carriages can move to and from a position opposite to the upper mold at a forming station S, a carriage transport mechanism A that transports the two carriages independently by driving motors attached to each carriage, a carriage guide mechanism B having a pair of rails extending perpendicular to a pressing direction of the forming press, and a positioning device C to determine the position of a carriage at the forming station that engages with the carriages.

2 Claims, 5 Drawing Sheets

PRIOR ART

FORMING EQUIPMENT COMPRISING CARRIAGES CARRYING LOWER MOLDS

The present invention is directed to a forming equipment comprising carriages carrying lower molds. More particularly it is directed to the forming equipment comprising a forming press where thermoplastic sheet material is of a flat rectangular shape, and the sheet material is heated to a predetermined temperature in a heating apparatus and softened, and formed with an upper and a lower mold, wherein the forming equipment comprises two carriages, each carrying a lower mold mounted on it and each independently movable to and from a forming station (a position where the sheet material is formed) where the upper mold is positioned.

BACKGROUND OF THE TECHNOLOGY

Conventionally, a forming equipment, such as a thermoforming equipment, which forms a laminate by press-forming thermoplastic sheet material and subsidiary material such as a fibrous substance in one body, employs a method wherein after the thermoplastic sheet material that is heated and softened is formed by an upper and a lower mold, and after a formed product is taken out manually or by a device that can take it out from the molds, the subsidiary material is placed on the predetermined position of the lower mold. Then, the next heated thermoplastic sheet material is transported and a next forming is carried out.

In this method the subsidiary material is manually placed in the lower mold and a worker does this work close to the molds and in the forming press. For this reason the heated sheet material cannot be transported into the forming press while the molded product is being taken out and the subsidiary material is being placed in the lower mold. Thus there is a problem in that the cycle-time for pressing cannot be shortened.

One method to shorten the cycle-time is, for example, one wherein a forming equipment and a trimming press which use lower molds of the same architecture are installed side-by-side, and a turntable is used for exchanging one mold for the other of the two lower molds, such that trimming and preparing the subsidiary material can be carried out using a lower mold while simultaneously the pressing that requires time is carried out using the other mold (see Patent Document 1).

However, this method has a problem in that it needs a large circular space for a table to turn.

Another method is to use equipment for temporary lamination wherein the equipment allows the material that is to be pressed to move backward and forward by a first and a second carriage and perpendicularly to the movement of a press for temporary lamination, which press is movable upward and downward (see Patent Document 2).

Also, there is an injection molding machine that comprises a first and a second station for preparation for a molding operation on both sides of a molding station, which station has a clamping device for a mold, and a first and a second shuttle carriage, wherein the first shuttle carriage moves between the molding station and the first preparation station for a molding operation, and the second shuttle carriage moves between the molding station and the second preparation station for a molding operation (see Patent Document 3).

By using the first and the second carriages that move backward and forward perpendicularly to the press for temporary lamination, such as in the equipment for temporary lamination, or by using the first shuttle carriage that moves between the forming station and the first preparation station for a forming operation, and the second shuttle carriage that moves between the station for forming and the second preparation station for a forming operation, such as in the injection forming machine, a cycle-time of a machine can be shortened even though the working space that is used is limited.

Patent Document 1: Publication of Laid-open Application No. 2005-125376
Patent Document 2: Publication of Laid-open Application No. 2001-191316
Patent Document 3: Publication of Laid-open Application No. 2004-345328

DESCRIPTION OF THE INVENTION

Problem to be Solved

However, the first and the second carriages of the equipment for temporary lamination are interlocked with each other by a ball screw mechanism and their movements are coordinated. Thus, if the ball screw mechanism is used, then taking out the molded products from the mold and preparing subsidiary material for forming outside the forming equipment cannot be carried out at the same time.

By contrast, in the injection forming machine the first and the second shuttle carriages each move backward and forward by means of a cylinder-mechanism. So, taking out the molded product from a forming machine and preparing subsidiary material for forming can be done outside the forming machine, at the same time.

However, like the equipment for temporary lamination, this injection forming machine tends to produce a product of a lower quality because the carriage is not designed so that it is kept fixed at the position where a forming is carried out. Thus the carriage carrying a lower mold is displaced when a carriage carrying the upper mold is pressed on it. If the ball screw mechanism of the equipment for temporary lamination, which mechanism is greatly superior in positioning a carriage, is used, a better positioning will be achieved. But the screw part may likely be damaged because of possible displacement of the carriage carrying the lower mold in the circumferential direction. Also, the cylinder mechanism of the injection forming machine is not strong enough to support a possible displacement of the carriage carrying the lower mold. So, if the cylinder were to support the load when a displacement occurs, the cylinder rod would be distorted.

To solve these problems the present invention aims to provide a forming equipment comprising carriages carrying lower molds, so that it can improve the quality of the product by fixing the carriages carrying lower molds at the forming position within the forming station.

Means to Solve the Problems

The forming equipment comprising the carriages carrying the lower molds of the present invention comprises a forming press that forms thermoplastic sheet material with upper and lower molds, wherein the equipment comprises two carriages, each carrying a lower mold, which carriages can move to and from the position opposite to the upper mold in the forming station, a carriage-transport mechanism that independently transports the two carriages by driving motors, one attached to each carriage, a carriage-guide mechanism along a pair of rails laid perpendicularly to the pressing direction of the forming press, and a means to determine the position of the carriages in the forming station by engaging the carriages.

The forming equipment of the present invention can improve the quality of the product because when the forming is carried out, the lower mold will not be displaced sideways.

This is because the carriage carrying lower molds is fixed to the forming position within the forming station.

Also, taking out the formed product from the mold and preparing subsidiary material for forming can be done outside the forming equipment. So, the work can be carried out in safer conditions. Also, the next forming operation can promptly be carried out because the time needed for taking out the molded product from the forming press and preparing subsidiary material in the molds would not be necessary if one additional lower mold is used. Thus the manufacturing can be completed in a shorter cycle-time and the effective working rate of the machine can be improved.

THE BEST MODE OF OPERATION

Figure 1:
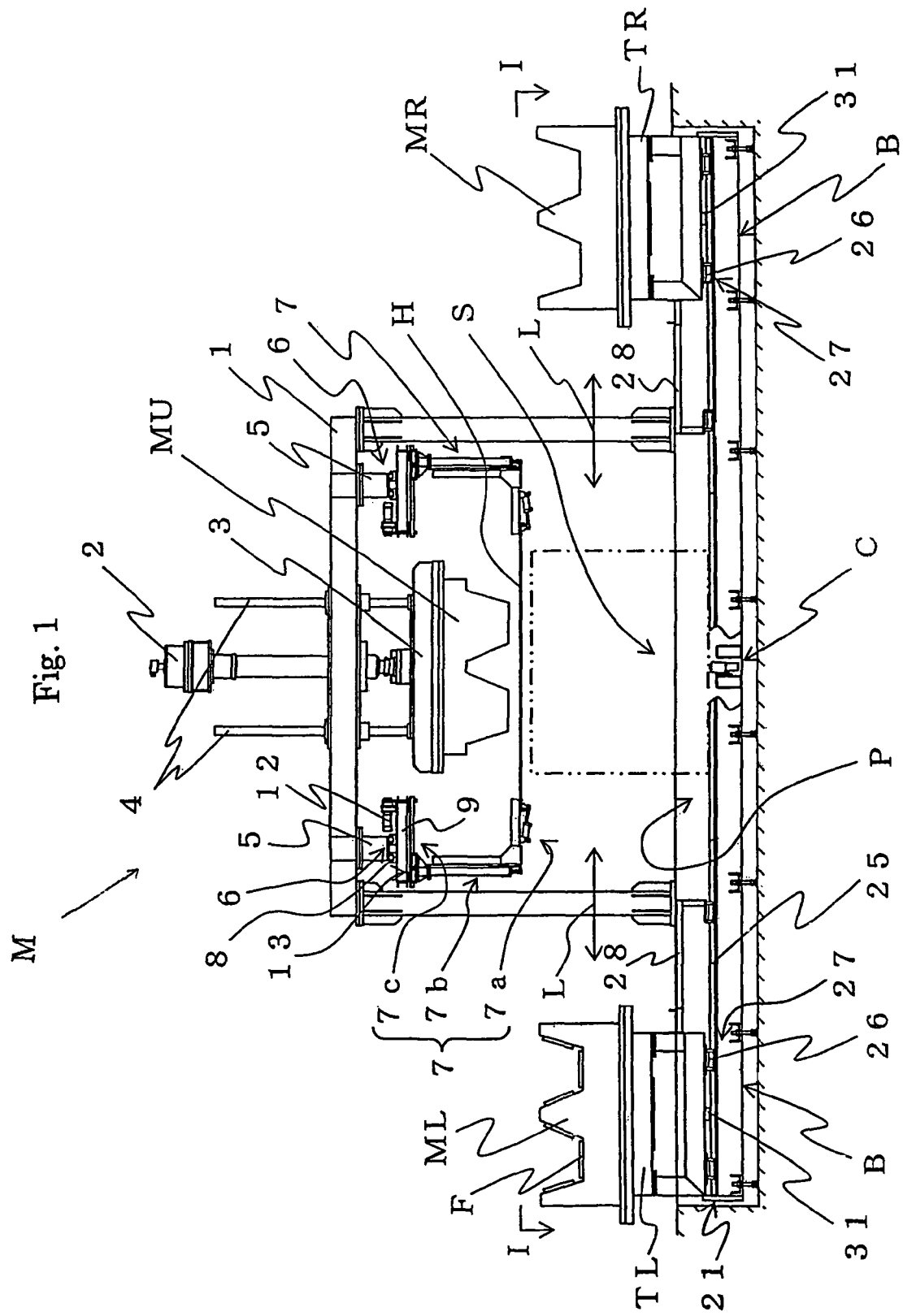
FIG. 1 shows a schematic view of one embodiment of the forming equipment comprising carriages carrying lower molds.
Figure 2:
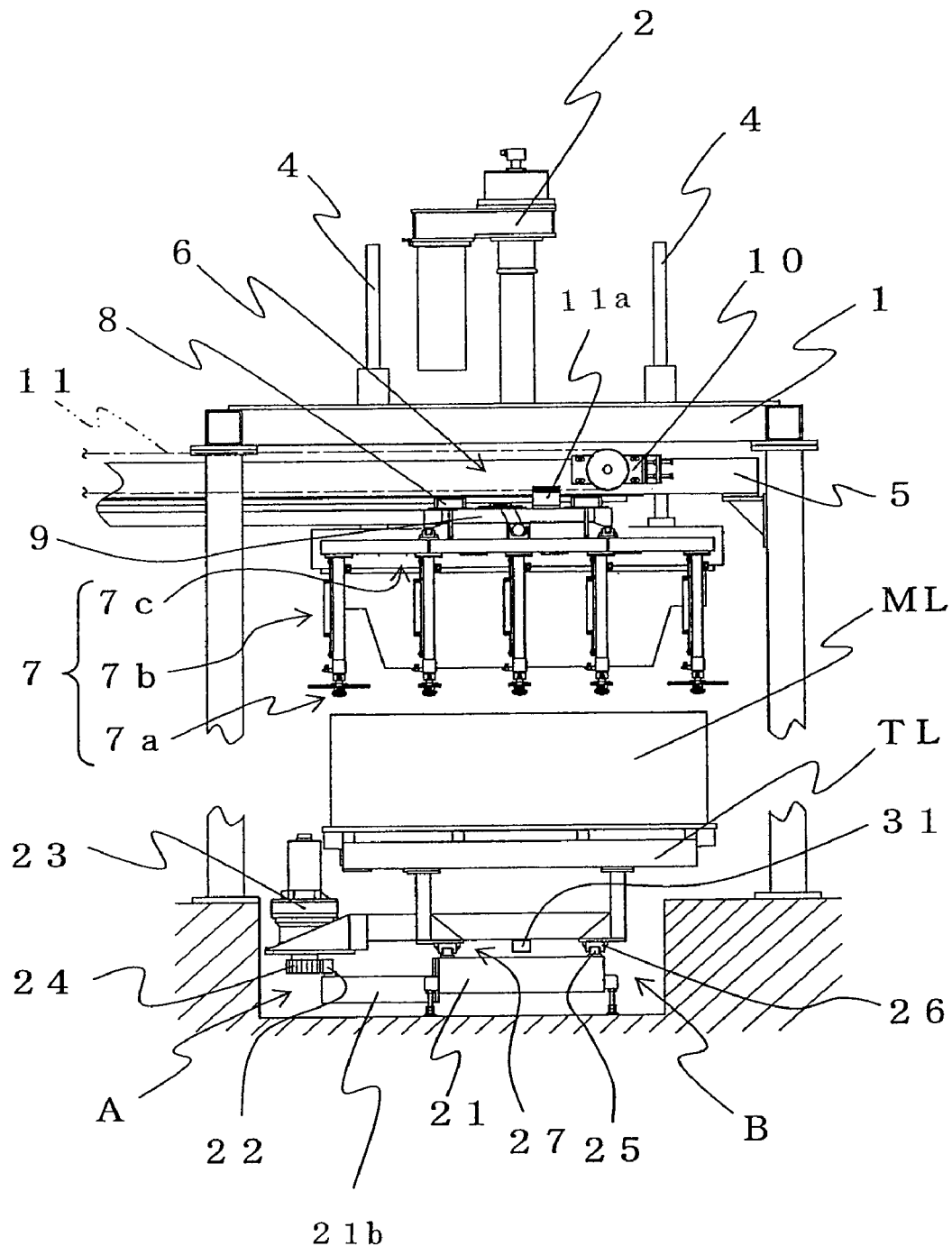
FIG. 2 is a side view of the forming equipment of FIG. 1 seen from the left.
Figure 3:
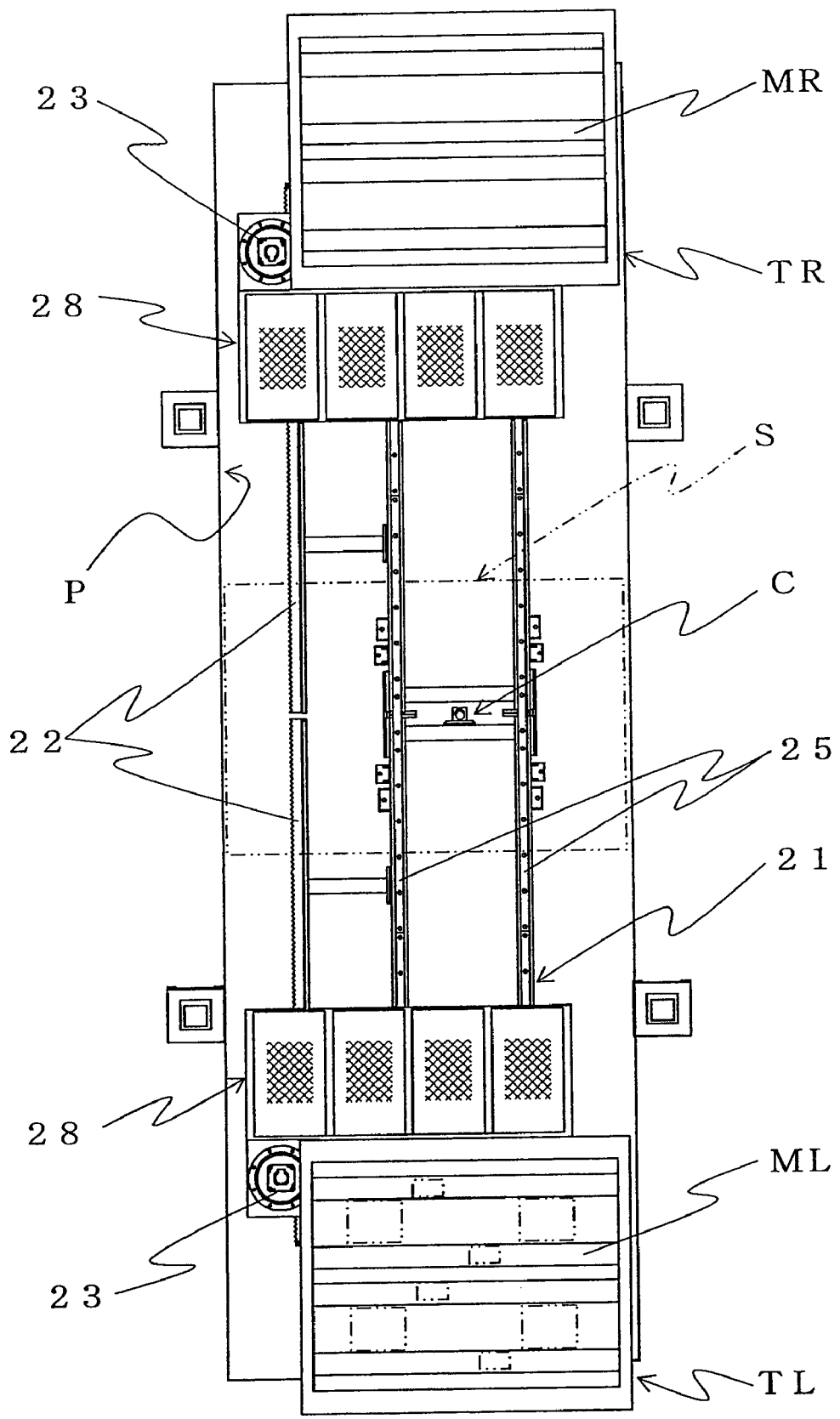
FIG. 3 is a cross-sectional view of the forming equipment on line I-I of FIG. 1.

The forming equipment comprising carriages carrying the lower molds of the present invention is explained below, based on the drawings attached to the application. As shown in FIGS. 1-3, the forming equipment comprising the carriages carrying the lower molds of the present invention comprises a forming press M where thermoplastic sheet material that is heated and softened in a heating apparatus (not shown) is formed by an upper mold MU and a lower mold ML, wherein two carriages TL, TR, carrying lower molds ML, MR, can move forward to and backward from the upper mold MU at forming station S, as shown by arrows L.

This forming equipment comprising the carriages carrying the lower molds comprises a carriage-transport mechanism A, which transports the two carriages TL, TR, independently (separately), a carriage-guide mechanism B that guides the two carriages TL, TR, and a means C that determines the position of the carriages TL, TR. FIG. 1 shows that a subsidiary material F is placed in the lower mold ML, one of the lower molds ML, MR.

The forming press M comprises a hoisting actuator 2 that is attached to the top part of the gate-type frame 1, and the upper mold MU, which is fixed to and suspended from a hoisting table 3, below the rod of the actuator. This hoisting table 3 is moved up and down vertically along guides 4 by the extension and contraction of the actuator 2. Also, a pair of frames 5 is installed, extending from the lower surfaces of the two end parts of the frame 1 to the heating apparatus, and is fixed to the frame.

A width-clamping mechanism 7 is connected to the pair of frames 5 via a clamp-transfer mechanism 6. Thus a sheet material H can be transported from the heating apparatus to the forming press M while it is held by the width-clamping mechanism 7. the carriage-transport mechanism A, the carriage-guide mechanism B, and the means C to determine the position of a carriage, are disposed within a pit P that is built in the floor and that extends in the direction that is perpendicular to the frame 1 (left-to-right direction).

An electrically-driven cylinder, oil hydraulic cylinder, or air cylinder can be used as an actuator 2. An electrically-driven cylinder, which has a simple structure, is preferred. This is because if an oil hydraulic cylinder or air cylinder is used, piping and a hydraulic pump or air pump, etc., are necessary, which will increase the cost.

In the present embodiment, the two carriages TL, TR are designed to move within the pit P, so that the upper mold MU can be arranged at a lower position. Thus a core (a block-type part within the upper mold, which part is exchanged depending on the type of car [4WD or a normal car]), can be changed without the hoisting table 3 being lowered.

The clamp-transfer mechanism 6 comprises a linear guide-part 8 consisting of traveling rails and guide portions, which guide-part is connected to the pair of frames 5, a frame for transport 9, a drive-motor for transport (not shown) installed on the side of the heating apparatus (not shown), a driven part 10, a belt 11 that connects the drive-motor for transport and the driven part 10, and a metal for fastening 11a fixed to both the frame for transport 9 and the belt 11. The belt 11 is driven by the drive-motor for transport and has the clamp-transfer mechanism 6 move between the heating apparatus and the forming press M.

The width-clamping mechanism 7, which is connected to the frame for transport 9, comprises one or more clamping means 7a that hold the sheet material H by the ends of the sides of the sheet material, which ends are in the direction of the running of the material H, one or more clamp-hoisting mechanisms 7b that lift and lower each of the clamping means 7a, and one or more width-adjusting mechanisms 7c that adjusts the width of the clamp-hoisting mechanism 7b by transferring it in the width-direction, which is perpendicular to the direction of the running of the material H.

In an embodiment, five sets of clamping means 7a and a clamp-hoisting mechanism 7b are each used. The number of sets can suitably be selected. Also, the clamping means 7a and the clamp-hoisting mechanism 7b can be of a cylinder mechanism, but their driving means are not limited to a cylinder mechanism. Further, the width-adjusting mechanism 7c can have a structure comprising a motor 12 and a linear guide 13, but it can also have other structures.

As shown in the present embodiment, each clamping means 7a that is to clamp the sheet material H is disposed on a side of the forming press M, while the material is molded. But alternatively the sheet material H can be clamped by a clamping means disposed on the side of the lower mold and be molded after the material is transported to the forming press M. If the claiming means were to be disposed on the side of the mold it could be arranged in any way that suitably matches the shape of the mold. But this would increase the cost of forming because the clamping means 7a that would match the mold must be prepared for each mold. In contrast, if the clamping means 7a is arranged on the side of the forming press M, as in the present embodiment, the cost of forming can be reduced. This is because to prepare only one set of clamping means 7a on the press side can adequately meet the purpose.

The carriage-transport mechanism A is not limited to any particular mechanism if it comprises the carriages TL, TR that can independently be driven by a motor and can be moved perpendicularly to the direction of the movement of the upper mold MU, which mold is lifted and lowered by the actuator 2. In the present embodiment the carriages have a driving mechanism where a pinion 24 fastened to the end of each servomotor 23 that is attached to each of two carriages TL, TR as a motor to drive each carriage, engages a rack 22 that is built in an arm-part 21b that extends from a base frame 21. In the present embodiment, the rack 22 is split into two parts at the position of the forming station S, but it need not necessarily be split.

Also, the carriages TL, TR can move by means of a linear guide 27 consisting of a pair of rails 25 installed on a base frame 21 having a support frame, and a guiding part 26. In the present embodiment, it is so designed that the carriages TL, TR can move by means of a linear guide 27, which constitutes the carriage-guide mechanism B and which consists of a pair of rails 25 and a guiding part 26. But it can also be designed in a way that the carriages TL, TR move by means of a pair of rails 25 and wheels.

Also, steps 28 are provided to the inner sides of the carriages TL, TR, so that a worker does not fall into a pit P when he or she works outside the forming press M.

Figure 4:
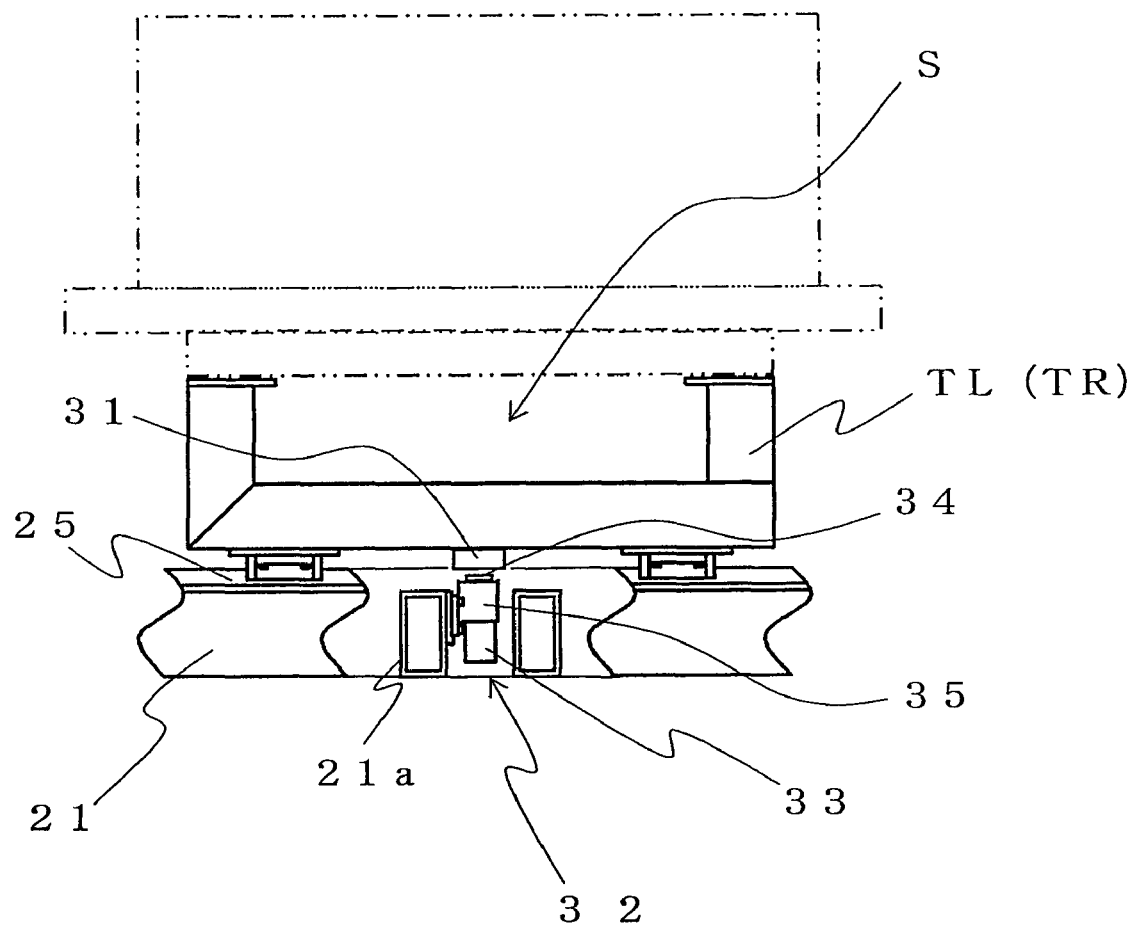
FIG. 4 is an enlarged view of the means to determine the position of the carriage shown in FIG. 1.

The means C to determine the position of the carriages TL, TR can be of any structure if it has a mechanism that can engage a receiving part 31 that is fixed to the lower part of the carriages TL, TR. In the present embodiment, as shown in FIG. 4, the means C to determine the position of the carriages TL, TR, has a hoisting actuator mechanism 32 attached to a support-beam 21a that bridges the base frames 21 between the pair of the rails 25. The hoisting actuator mechanism 32 has a pin 34 fixed to the end of a hydraulic actuator 33 in a way that it can move upward. The pin 34 can move while it keeps a sliding contact with a guide block 35. When the carriage TL (TR) moves within the forming station S, the hydraulic actuator 33 determines the position of the carriage TL (TR) by engaging the pin 34 with the receiving part 31 that is fixed to the lower part of the carriage TL (TR).

Also, in the present embodiment, so as to improve the accuracy of positioning the carriages TL, TR, when they stop at the forming station S, preferably a control part or mechanism that directs the release of the positioning (the release signal), which positioning is carried out by the servomotor 23 driving each carriage and the control part for the release activates the hydraulic actuator 33 of the means C to determine the position of the carriages TL, TR.

Figure 5:
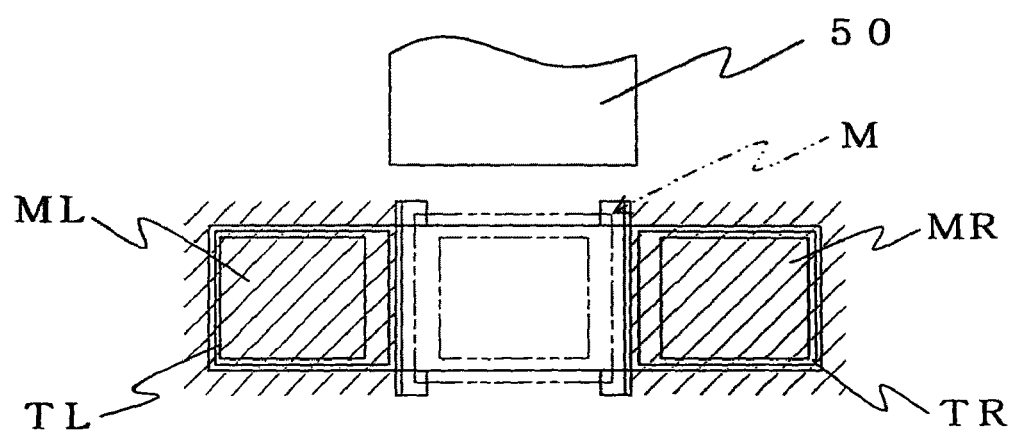
FIG. 5 illustrates the working areas for a worker in an embodiment of the forming equipment of the present invention.
Figure 6:
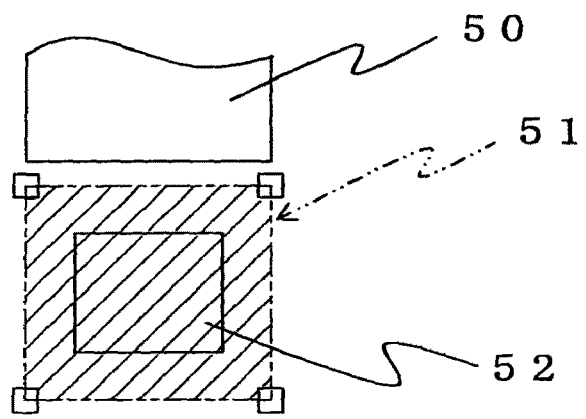
FIG. 6 illustrates the working area for a worker in an embodiment of conventional forming equipment.

Now the difference between the forming equipment of the present invention and conventional forming equipment in the working area for a worker is explained, based on FIGS. 5 and 6. In the figures the shaded portions show the working area for the worker and the symbol 50 denotes a heating apparatus. As shown in FIG. 5, in the present embodiment the worker can work on the lower molds ML, MR, of the carriages TL, TR that are transported to either the left-hand side or right-hand side working area, without entering the forming press. In contrast, as shown in FIG. 6, in the conventional forming equipment the worker enters the forming press and works directly on the lower mold 52 disposed in the forming press 51. In the present embodiment the worker need not enter the forming press at all. Thus the height and width of the equipment can be reduced. If the equipment for taking out the product and the equipment for trimming are added at the position where each of the carriages TL, TR moves out, an automated operation is possible inclusive of the trimming step, and the number of workers can be reduced.

Below the operation of the forming equipment in the embodiment of the present invention is explained, starting from the stage where the carriage TR carrying the lower mold MR moves to the forming station S and the forming of the sheet material H starts.

The worker places a subsidiary material F onto the carriage TL carrying the lower mold ML, which carriage was moved outside. After completing the placing of the subsidiary material F, the worker leaves the working area, and then pushes a button (not shown) to signal the end of the work.

Then after the completion of the forming a shutter (not shown) attached to the gate frame 1, through which the carriages TL, TR enter and exit the forming press M, is lifted in a movement that is coordinated with the lifting of the upper mold MU, the lifting being carried out by the contraction of the hoisting actuator 2. Then the pin 34 is released from the receiving part 31 by the contraction of the hydraulic actuator 33. The servomotor 23 for driving the carriage TR rotates reversely and the carriage TR stops at a target position in the working area.

Simultaneously the servomotor 23 for driving the carriage TL rotates in the normal direction and the carriage TL stops at a target position of the forming station S. Then the pin 34 of the hydraulic actuator 33 is raised by releasing the control for positioning by the servomotor 23 and engages with the receiving part 31, whereby the carriage TL is secured to the forming station S. Then the shutter (not shown) is lowered.

Next, the sheet material H that was heated in the heating apparatus moves from the heating apparatus to above the forming station S together with the width-clamping mechanism 7 that clamps the material with the clamping means 7a. Then the material is inserted between the upper mold MU and the lower mold ML that is placed on the carriage TL. Then the upper mold MU is lowered by the hoisting actuator 2 being extended, and then forming is carried out. More particularly, the sheet material H is lowered via the clamp-hoisting mechanism 7b in a movement synchronized with the lowering of the upper mold MU. While the forming is carried out at the forming station S, the molded product on the lower mold MR that is placed on the carriage TR that has moved outside is taken out and the next subsidiary material F to be molded is placed on the lower mold MR. When the placing is completed the worker leaves the working area and pushes a button to signal the completion of the preparation.

Then when the forming is completed the clamping means 7a is expanded and lifted via the width-clamping mechanism 7 to where it does not interfere with the upper and the lower molds MU and MR. Then the width-clamping mechanism 7 is returned to the heating apparatus. At the same time the upper mold MU is lifted by the hoisting actuator 2 while it is contracted. Also, the shutter is lifted and the pin 34 of the actuator 33 is lowered so that it is released from the receiving part 31. Then the carriage TL is stopped at the target position in the waiting area by the motor rotating reversely. Simultaneously the carriage TR is stopped at the target position of the forming station S by the motor being rotated in the normal direction.

Next, the carriage TL is fixed to the forming station S by the pin 34 of the hydraulic actuator 33 being raised after the control of the positioning by the servomotor 23 is released. Then the shutter is lowered. With this cycle being repeated, molded products are manufactured.

In the present embodiment, as explained above, fixing the carriage carrying the lower mold at the target position in the forming station prevents the sheet material from being displaced from its target position. Thus the quality of the product can be improved.

Also in the present embodiment, two lower molds can separately and alternately enter and exit the area of the upper mold of the forming press, wherein while one lower mold is engaged in the forming within the forming press, the product is taken out from the other mold that has exited from the forming press, and also the subsidiary material that will be used in the next forming is prepared on that mold. So the forming press need not await the delivery of the next subsidiary material, and thus the cycle-time is shortened.

Further, as the worker can work with the lower mold on the carriage that is outside the forming press, the safety of the worker is secured. Also, the efficiency of the work increases. Moreover, to take precautionary measures to keep people away from the area of the forming press is not necessary, so that many advantages are expected, such as that the space required for the workers can be minimized, the size of the forming press can be reduced, etc.

The basic Japanese Patent Application, No. 2007-309680, filed Nov. 30, 2007, is hereby incorporated in its entirety by reference in the present application.

The present invention will become more fully understood from the detailed description of this specification. However, the detailed description and the specific embodiment illustrate desired embodiments of the present invention and are described only for the purpose of an explanation. Various possible changes and modifications will be apparent to those of ordinary skill in the art on the basis of the detailed description.

The applicant has no intention to dedicate to the public any disclosed embodiments. Among the disclosed changes and modifications, those that may not literally fall within the scope of the present claims constitute, therefore, a part of the present invention in the sense of the doctrine of equivalents.

The use of the articles "a," "an," and "the," and similar referents in the specification and claims, are to be construed to cover both the singular and the plural, unless otherwise indicated herein or clearly contradicted by the context. The use of any and all examples, or exemplary language (e.g., "such as") provided herein, is intended merely to better illuminate the invention and does not pose a limitation on the scope of the invention unless otherwise claimed.

The invention claimed is:

1. A forming equipment comprising, a forming press that molds thermoplastic sheet material between an upper mold and a lower mold,
    two carriages, each carrying a lower mold, both of which carriages can move to and from a position opposite to the upper mold at a forming station;
    a carriage-transport mechanism that independently transports the two carriages by driving motors attached to each carriage;
    a carriage-guide mechanism having a pair of rails extending perpendicular to a pressing direction of the forming press along which the carriages move;
    a positioning means for determining the position of the carriages at the forming station that engages with the carriages, wherein the positioning means comprises an actuator mechanism at the forming station that is disposed between the pair of rails and that engages a receiving part fixed to a lower part of each carriage when the carriage is at the forming station to fix the carriage at the station; and
    a control mechanism that directs release of the engagement of the positioning means, and that activates the positioning means when a carriage stops at the forming station.

2. The forming equipment of claim 1, wherein the carriage-transport mechanism, the carriage-guide mechanism, and the positioning means are located within a pit that is in a floor for the forming equipment.

* * * * *